3,216,922
HYDROCARBON CONVERSION CATALYSTS AND
PROCESS FOR USE OF THE SAME
Mark J. O'Hara, Mount Prospect, Ill., assignor to Universal Oil Products Company, Des Plaines, Ill., a corporation of Delaware
No Drawing. Filed July 15, 1964, Ser. No. 382,927
13 Claims. (Cl. 208—111)

This application is a continuation-in-part of my copending application, Serial No. 12,928, filed on March 7, 1960, now abandoned.

This invention relates to improved catalytic compositions of matter which may be used for the conversion of hydrocarbons and particularly to catalytic compositions of matter which are useful in hydrocracking reactions. More specifically, the invention is concerned with catalytic compositions of matter comprising metals of Group VIB of the Periodic Table, Group VIII of the Periodic Table and mixtures thereof composited on a solid support which has been prepared in a specific manner, said substances being used as catalysts in the hydrocracking of hydrocarbons. In addition, the invention also relates to a process for using these catalysts for the conversion of hydrocarbons.

Destructive hydrogenation which may also be referred to as "hydrocracking," the latter term being used hereinafter in the specification and appended claims, as distinguished from the simple addition of hydrogen to unsaturated bonds between hydrocarbons, involves definite changes in structure and may be designated as cracking under hydrogenation conditions so that the lower boiling products of the cracking reactions are substantially more saturated than when hydrogen or materials supplying hydrogen are not present. Destructive hydrogenation processes are most commonly employed on coals or heavy residual or distillate oils for the production of substantial yields of low boiling saturated products and to some extent of intermediates which are utilizable as domestic fuels, and still heavier cuts which find uses and are suitable as lubricants. These destructive hydrogenation processes or hydrocracking processes may be operated on a strictly thermal basis or in the presence of a catalyst. In this respect an extremely large number of materials have been employed, for example, the metals of the iron group, including iron, nickel or cobalt and the oxides and sulfides of chromium, molybdenum and tungsten representing the metals in the left-hand column of Group VI of the Periodic Table. In addition, numerous mixed metal and metal oxide catalysts have also been tried, as well as less common metal salts.

As hereinbefore set forth, the hydrocracking or splitting of carbon to carbon bond is relatively important in treating cracked gasolines, particularly thermally cracked gasoline either alone or in admixture with straight-run gasoline. Controlled or selective cracking is highly desirable inasmuch as such cracking will result in a product of improved anti-knock characteristics. In general, the lower molecular weight products possess higher octane numbers, and thus a final gasoline product of lower average molecular weight will usually have a higher octane rating. Furthermore, during the cracking reaction isomerization of other molecular rearrangement occurs which also results in products having higher anti-knock characteristics. The selective cracking is also of particular advantage when the charge stock contains components boiling above about 400° F. in order to convert these components to fractions boiling below about 400° F. Therefore, it is readily apparent that the selective cracking results not only in an improved quality product but also in an increase in the quantity of the desired product.

However, the cracking must be selective and must not result in the decomposition of the normally liquid hydrocarbons substantially or completely into normally gaseous hydrocarbons. The desired selective cracking generally comprises the splitting of a higher boiling hydrocarbon molecule into two molecules, both of which are normally liquid hydrocarbons. To a lesser extent it comprises the removal of methyl, ethyl and propyl groups which, in the presence of hydrogen, are converted to methane, ethane and propane. However, the removal of these radicals is controlled so that not more than one or possibly two of such radicals are removed from a given molecule. For example, in the presence of hydrogen, decane may be reduced to two pentane molecules, heptane to hexane, nonane to octane or heptane, etc. On the other hand, uncontrolled or non-selective cracking will result in the decomposition of normally liquid hydrocarbons into normally gaseous hydrocarbons as, for example, by the continued demethylation of normal heptane to produce seven methyl groups which, in the presence of hydrogen, are converted to methane.

Another important objection to non-selective or uncontrolled cracking is that this type of cracking will result in the more rapid formation of larger quantities of coke or carbonaceous material which deposits on the catalyst and decreases or destroys its activity to catalyze the desired reactions. This, in turn, results in shorter processing cycles or periods, with the necessity of more frequent regeneration of the catalyst by burning the carbonaceous product therefrom or, should the catalyst activity be destroyed, it may be necessary to shut down the unit to remove old catalyst and replace it with new catalyst.

Yet another important factor in successful reforming processes is the matter of hydrogen production and consumption. Investigation has shown in the process of hydrogenation that the presence of hydrogen in the reforming zone further tends to decrease the amount of carbonaceous deposit on the catalyst. In view of the fact that the cost of hydrogen is quite high, it is essential that there be no net consumption of hydrogen or, in other words, at least as much hydrogen must be produced in the process as is consumed therein.

Heretofore, the prior art contains many examples of catalytic compositions of matter which may be used for the conversion of hydrocarbons and more specifically, for the hydrocracking of hydrocarbons. These catalysts usually comprise a cracking support having incorporated therein a metallic component. Other catalyst comprise a cracking support such as a silica-alumina mixture having an activated clay incorporated therein, the object being to prepare a more economical cracking catalyst. However, catalysts of this type do not contain a hydrogenation metal component thus rendering these catalysts useful for hydrocracking or destructive hydrogenation. Other prior art patents disclose the use of a refractory oxide catalyst having acidic properties which are promoted by the addition of a hydrogenation metal. However, these catalysts are used for isomerization rather than for destructive hydrogenation or hydrocracking.

Other prior art references have also taught various methods of catalyst preparation such as utilizing a totally polymerized silica gel which is polymerized to such a state that it is solid in nature and can be cut into various forms such as cubes, following which the solid silica gel is impregnated with aluminum sulfate. The resulting support is then utilized in the further preparation of a catalyst which may be used for hydrocracking. However, as will be hereinafter shown in greater detail, catalysts of this type will possess a relatively low hydrocracking activity. Another method of preparing a catalyst as shown in the prior art comprises preparing a solid support by adding an acid to water glass prior to impregnation with the hydrogenation metal component. The support which is utilized in the method will usually contain about 90% silica and only 10% alumina.

In contradistinction to these prior art methods of catalyst preparation, I have now discovered that a hydrocracking catalyst may be prepared in a certain manner, hereinafter set forth in greater detail, whereby catalytic compositions of matter are obtained, said catalytic compositions of matter possessing superior hydrocracking activity over those prepared by the prior art methods.

It is therefore an object of this invention to provide a catalyst composition which will provide the most effective conversion of feed stocks containing a relatively high boiling range to products which possess the desired boiling ranges substantially lower than the original boiling point ranges.

A further object of this invention is to provide a catalytic composition of matter containing a metallic hydrogenation component composited on an acidic cracking support, said cracking support containing a specific amount of one of the metal oxide components necessary to obtain an optimum hydrocracking activity of the catalyst.

In a broad aspect one embodiment of this invention resides in a hydrocarbon conversion catalyst which comprises at least one metal selected from the group consisting of the metals of Groups VIB and VIII of the Periodic Table composited on a solid acidic support comprising a mixture of silica and alumina in a mole ratio of about 5 moles of silica per mole of alumina, the silica being a silica hydrogel which has been aged for a period of at least one hour at a pH in the range of from about 3 to about 8 prior to compositing with said alumina.

A further embodiment of this invention resides in a process for the conversion of hydrocarbons which comprises destructively hydrogenating said hydrocarbons in contact with a catalytic composite of at least one metal selected from the group consisting of the metals of Groups VIB and VIII of the Periodic Table supported on a mixture of silica and alumina, said silica being present in a mole ratio of from about 5 moles of silica per mole of alumina, the silica being a silica hydrogel which has been aged for a period of at least one hour at a pH in the range of from about 3 to about 8 prior to compositing with said alumina.

A specific embodiment of this invention is found in a hydrocracking catalyst which comprises 0.4% by weight of palladium composited on a solid acidic cracking support comprising a mixture of silica and alumina in a mole ratio of about 5 moles of silica per mole of alumina, the silica being a silica hydrogel which has been aged for a period of at least one hour at a pH in the range of from about 3 to about 8 prior to compositing with said alumina.

Another specific embodiment of this invention is found in a process for the conversion of hydrocarbons which comprises destructively hydrogenating said hydrocarbons in contact with a catalytic composite comprising about 0.4% by weight of platinum supported on a mixture of silica and alumina, said silica being present in a mole ratio of from about 5 moles of silica per mole of alumina, the silica being a silica hydrogel which has been aged for a period of at least one hour at a pH in the range of from about 3 to about 8 prior to compositing with said alumina.

Other objects and embodiments will be found in the following further detailed description of this invention.

As hereinbefore set forth, the present invention is directed to catalytic compositions of matter containing a metallic hydrogenation component composited on an acidic cracking support, said catalyst being used for the conversion of hydrocarbons and specifically in a hydrocracking process. Hydrocracking is most advantageously applied to petroleum feed stocks of the middle distillate range and above, such as kerosene fractions, gas oil fractions, lubricating oil, the high boiling bottoms recovered from the fractionators accompanying catalytic cracking operations and referred to as heavy recycle stock, fuel oil stocks and other sources of hydrocarbons having a depreciated market demand because of the high boiling points of these hydrocarbons, along with the presence of asphalt and tarry residues which accompany these stocks.

The metallic component of the catalyst comprises a metal selected from Groups VIB and VIII of the Periodic Table and mixtures thereof, such metals including chromium, molybdenum, tungsten, iron, cobalt, nickel, palladium, platinum, ruthenium, rhodium, osmium and iridium composited on a suitable cracking catalyst or solid support, either naturally occurring or synthetically produced. It has now been discovered that the preferred solid support comprises a synthetically produced silica-alumina mixture in which the mole ratio of silica to alumina must be within a certain range in order to produce the most active hydrocracking support as will hereinafter be shown by comparison with other solid supports in which the two components do not fall within the required mole ratio. It is also contemplated within the scope of this invention that other solid supports may also be utilized as the cracking component of the catalyst although not necessarily with equivalent results, said cracking components including synthetically produced silica-zirconia, silica-alumina-zirconia, silica-magnesia, silica-alumina-magnesia, silica-alumina-thoria, etc. Inasmuch as alumina is more active per se as regards cracking activity than is silica, it follows that the alumina should be incorporated into the silica-alumina structure in order that the optimum number of aluminum atoms are placed in a position more readily available for contact with the impregnated metallic hydrogenation component, said component being a metal of the type hereinbefore set forth, and also to the hydrocarbons which are being processed therethrough. It has now been found that the catalyst base which, when composited with a metallic hydrogenation component, possesses the greatest relative activity for hydrocracking is one in which the mole ratio of silica to alumina is approximately 5 moles of silica per mole of alumina or, in other words, a composition of approximately 75% silica and 25% alumina. With this combination 1 molecule of alumina ($Al_2O_3$) combines with 5 molecules of silica ($SiO_2$) and produces an optimum composition in regard to hydrocracking activity. In an appreciably higher alumina content is used, the alumina predominates in the support and approaches the properties of alumina alone. On the other hand, if the silica content is too high, the catalyst will have a tendency to acquire the inactive properties of silica. As will be shown hereinafter in greater detail, the aforesaid ratio of 5 moles of silica per mole of alumina will produce a catalyst which is possessed of optimum hydrocracking activity.

In addition, it has now been discovered that if a silica and an alumina are co-precipitated, the greater part of the alumina is buried in an inactive position. Therefore, a particularly advantageous method of preparing a cracking component of the hydrocracking catalyst, which comprises a silica-alumina mixture in a mole ratio hereinafter set forth, is to allow the silica to at least partially polymerize before the addition of an aluminum salt as the source of alumina. As will be hereinafter shown, by allowing the aforesaid silica to at least partially polymerize before the addition of alumina, the acidic cracking support in combination with the hydrogenation metal comprising at least one metal selected from the group consisting of the metals of Groups VIB and VIII of the Periodic Table, as well as mixtures thereof, will possess a relative hydrocracking activity which is far superior to any catalysts which have been heretofore prepared according to the methods of the prior art.

Silica may be prepared in any suitable manner, one method being to commingle water glass and a mineral acid such as hydrochloric acid, sulfuric acid, etc. under conditions to precipitate a silica hydrogel. The silica hydrogel is then allowed to age, after the pH has been adjusted to a range of from about 3 to about 8, for a period of about 1 hour or more thus allowing the silica to at least partially polymerize. While the silica is allowed to age for at least one hour, the preferred time period during which the silica ages at a pH in the range of from about 3 to about 8 will be from about 0.5 to about 5 hours and preferably 1 hour to about 3 hours. In addition, the preferred pH at which the silica hydrogel is allowed to age will be in the lower range between 3 and about 8 and will usually be in the range of from about 3 to about 5. Following the aging of the silica gel, the pH is then raised by the addition of a basic substance such as ammonium hydroxide, sodium hydroxide, etc. to the upper range of the aforementioned limit, usually in a range of from about 6.5 to about 8. Following this, the alumina in the form of an aluminum salt such as aluminum sulfate, aluminum chloride, aluminum nitrate, etc. is added thereto. The silica-alumina hydrogel is precipitated and treated by washing, filtering, reslurrying, spray drying, pelleting and calcination in the usual manner.

The active metallic component of the catalyst is then composited with the cracking component, generally in an amount of from about 0.01% to about 20% by weight of the catalyst. The particularly desirable metal components to be incorporated into the catalyst comprise platinum, palladium, nickel, molybdenum or mixtures thereof and may be incorporated into the catalyst in any suitable manner. One such manner is to composite the metal component with the cracking component by forming an aqueous solution of the halide of the metal such as platinum chloride, palladium chloride, platinum bromide, palladium bromide, nickel nitrate, ammonium molybdate, etc., further diluting the solution and adding the resultant diluted solution to the cracking component in a steam drier. In addition to this method, a separate aqueous solution of the metal halide or other metal salt and ammonium hydroxide is added thereto to give the solution a pH between the range of from about 5 to about 10. This solution is then commingled with the other component of the catalyst. Other suitable metal solutions may be employed, such as colloidal solutions or suspensions including the desired metal cyanides, metal hydroxides, metal oxides, metal sulfides, etc. In cases where these solutions are not soluble in water at the temperature used, other suitable solvents such as alcohols, ethers, etc. may be utilized.

The concentration of the metal component selected from Group VIB of the Periodic Table, Group VIII of the Periodic Table or mixtures thereof will vary according to the particular component selected and the conversion process in which it is to be used. However, as hereinbefore set forth, the concentration generally will lie within the range of from about 0.01% to about 20% by weight of the final catalyst (calculated as the metal). When a Group VIB metal is the only metallic component, it may be present in an amount of from about 3 to about 10% by weight of the support; a Group VIII metal may be present in an amount ranging from about 0.01 to about 10% by weight of the support.

The resultant composite, after all of the components of the catalyst are present therein, is then dried for a period ranging from about 1 to about 8 hours or more in a steam drier and then oxidized in an oxidizing atmosphere such as air or other oxygen-containing gas at a temperature in the range of from about 1100° to about 1700° F. and preferably in a range of from about 1300° to about 1400° F. for a period of time ranging from about 1 to about 8 hours or more. Following this oxidation at a relatively high temperature, the catalyst is then reduced for a period ranging from one-half hour to about one hour at a temperature in the range of from about 600° to about 1000° F. and preferably at a temperature of about 800° F. in the presence of hydrogen. It is also contemplated within the scope of this invention that the catalyst may be reduced in situ, that is, by placing the catalyst in the reactor and submitting said catalyst to a hydrogen purge of the system at a temperature of about 600° F. thereby reducing the catalyst.

As hereinabove mentioned, the catalysts formed according to the process of the present invention which contain the metallic hydrogenation component in an amount in the range of from about 0.05 to about 20%, preferably in an amount in the range of from about 0.1 to about 10% by weight of the support, and which have been calcined at the desired temperatures, preferably in a range of from about 1300° to about 1400° F., are particularly suitable for use in the hydrocracking of gasoline or fractions thereof. The exact operations depend to a large extent upon the character of the charge stock as well as the activity of the catalyst which is used. Generally speaking, the conditions of the hydrocracking process will be such that the process is effected at temperatures ranging from about 500° to about 1000° F., at a pressure of from about 50 to about 1,500 pounds per square inch or more and at liquid hourly space velocities (defined as the amount of oil per hour per weight of catalyst in the reaction zone) of from about 0.5 to about 20 or more. The hydrocracking is preferably effected in the presence of hydrogen which may be introduced from an extraneous source or recycled from within the process. In the preferred mode of operation sufficient hydrogen is produced and recycled so that no extraneous source of hydrogen is necessary.

The hydrocracking process utilizing the catalyst of the present invention may be effected in any suitable manner and may comprise either a batch or a continuous type operation. When utilizing a continuous type operation, which is the preferred manner, the catalyst may be deposited as a fixed bed in a reaction zone which is maintained at the desired operating conditions of temperature and pressure and the hydrocarbons to be treated are continuously charged thereto and passed through said catalyst in either an upward or downward flow. Yet another type of operation which may be used is the moving bed type of process in which the catalysts and hydrocarbons are passed either in concurrent or countercurrent flow through a reaction zone or the catalyst may also be used in a suspensoid type of operation in which the catalyst and hydrocarbons are passed as a slurry through the reaction zone. The reactants from any of the hereinbefore mentioned reaction zones are continuously withdrawn, separated and normally subjected to further treatment such as the stabilization of the product to separate normally gaseous products therefrom and to obtain a final product which possesses the desired volatility.

The following examples are given to illustrate the process of the present invention which, however, are not intended to limit the generally broad scope of the present invention in strict accordance therewith.

EXAMPLE I

A series of catalyst bases containing varying amounts of silica in proportion to alumina were prepared. The amount of silica in the silica-alumina base varied from 37% to 88% with a corresponding decrease of alumina content from 63% to 12%. In the first instance a base containing 37% silica was prepared by diluting 790 grams of water glass (28% $SiO_2$) with 1580 cc. of water, following which the solution was added over a 0.5 hour period, with continuous stirring, to 200 cc. of hydrochloric acid plus 400 cc. of water. The resulting solution was stirred for a period of 1.5 hours during which time the sol became very viscous, 320 cc. of water was added and stirred for an additional period of one hour. The pH of the solution was raised to 7.2 by the addition of 1500 cc. of water plus 10 cc. of ammonium hydroxide. Following this, 5220 grams of aluminum sulfate solution (1.28 sp. gr.) was added, the pH of the resulting solution being 3.2. The alumina-silica sol was then added to 1560 cc. of ammonium hydroxide plus 1560 cc. of water, the final gel being stirred for an additional 15 minutes.

The gel was filtered, reslurried in 8 liters of water, spray-dried, washed free of salts, formed into pills and calcined at 1200° F.

EXAMPLE II

A cracking catalyst base containing 54% silica was prepared by diluting 1160 grams of water glass (28% $SiO_2$) with 2330 cc. of water, the solution being added over a period of 0.5 hour to a solution of 300 cc. of hydrochloric acid plus 700 cc. of water. Following the addition, 32 grams of water glass was added to adjust the pH to 3.5 and the sol was then stirred until it became viscous. An additional amount of 2750 cc. of water was added to the viscous sol and stirred for one hour. The pH of the solution was raised to 7.0 by the addition of 6 liters of water plus 10 cc. of ammonium hydroxide and the sol was stirred for one hour. Following this, 3700 grams of aluminum sulfate solution was added to bring the pH down to 3.2. The pH was again adjusted by the addition of 1100 cc. of ammonium hydroxide plus 1100 cc. of water, the final pH of the gel being 7.3. The gel was then stirred for 15 minutes, filtered, reslurried in water, spray-dried, washed free of salts, pilled and calcined at 1200° F.

EXAMPLE III

A silica-alumina cracking catalyst base containing 64% silica was prepared by diluting 1375 grams of water glass (28% $SiO_2$) with 2750 cc. of water and the resulting solution then being added over a 0.5 hour period to 345 cc. of hydrochloric acid plus 700 cc. of water. The final pH was adjusted to 3.4 by adding an additional 3 cc. of hydrochloric acid plus 30 cc. of water, following which the sol was stirred until it became viscous. After this, 2 liters of water were added and the mixture stirred for an additional hour. The pH was raised to 7.0 by the addition of 6030 cc. of water plus 13 cc. of ammonium hydroxide and the sol was stirred for an additional hour. Following this, 2920 grams of aluminum sulfate solution was added and the aluminum silica sol was stirred for 15 minutes. The pH was then adjusted by the addition of 870 cc. of ammonium hydroxide plus 870 cc. of water, the addition being accompanied by vigorous stirring. The resultant gel was filtered and reslurried in 8 liters of water, spray-dried, washed free of salts, pilled and calcined at 1200° F.

EXAMPLE IV

A cracking catalyst base containing 75% silica was prepared by diluting 400 cc. of hydrochloric acid with 800 cc. of water, following which 1610 grams of water glass (28% $SiO_2$) and 3229 cc. of water was added to the hydrochloric acid solution with continuous stirring over an 0.5 hour period. The pH of the solution was adjusted to 3.7 by the addition of 31 cc. of water glass. Following this, the sol was then stirred until it became viscous, 3800 cc. of water then being added. The sol was allowed to age at this pH while stirring for a period of about one hour. Following this, 6 liters of water and 15 cc. of ammonium hydroxide were added to raise the pH to 7.1 while continuously stirring the mixture, the stirring then being continued for an additional hour. The alumina portion of the catalyst was added by adding 2020 grams of aluminum sulfate solution. The pH was then adjusted to 7.9 by adding 640 cc. of ammonium hydroxide plus 640 cc. of water to the silica-alumina sol, said addition being accompanied by vigorous stirring. The resultant gel was slurried for 15 minutes, filtered, reslurried in 8 liters of water, spray-dried, washed free of salts, pilled and calcined at 1200° F.

EXAMPLE V

A silica-alumina cracking catalyst base containing 88% silica was prepared by diluting 1890 grams of water glass (28% $SiO_2$) with 3780 cc. of water and added to 475 cc. of hydrochloric acid plus 1 liter of water over a period of 0.5 hour. The final pH of the acid siliac sol was adjusted to 3.5 by adding an additional 25 cc. of water glass. The sol was stirred until it became viscous after which 6 liters of water was added to thin out the sol and the stirring was continued for an additional hour. Two liters of water plus 10 cc. of ammonium hydroxide were then added to raise the pH to 6.8, this pH being held with stirring for one hour. The alumina portion of the catalyst base was introduced by adding 1000 grams of aluminum sulfate solution having a specific gravity of 1.28 to the sol, the pH of the resulting sol being 3.4. The pH was then adjusted to 7.8 by adding 334 cc. of ammonium hydroxide plus 300 cc. of water. The resulting gel was then filtered, reslurried in 8 liters of water, spray-dried, washed free of salts, pilled and calcined at a temperature of 1200° F.

EXAMPLE VI

The desired hydrocracking catalysts were prepared by compositing palladium on the cracking catalyst base in such a manner so that the finished catalytic composition of matter contained about 0.4% by weight of palladium.

The catalyst base prepared according to Example I (150 cc.) was impregnated with a solution of 1.0 gram of palladium chloride dissolved in 150 cc. of water plus 5 cc. of hydrochloric acid, the solution thereafter being diluted to 225 cc. with additional water. The addition of the palladium solution to the catalyst base took place in a steam rotating drier. The dried catalyst was then oxidized in a muffle oven for a period of one hour at 1300° F. and was designated as Catalyst I.

To 69 grams of the catalyst base prepared according to Example II was added 115 cc. of a palladium solution containing 0.0024 gram of palladium per cc., said impregnation being effected in a steam rotating drier. Following the impregnation, the dried catalyst was oxidized in a muffle oven at 1300° F. for a period of one hour, the finished product being designated as Catalyst II.

The catalyst base prepared according to Example III above was impregnated by adding 225 cc. of a solution containing 1.0 gram of palladium chloride and 5cc. of hydrochloric acid, said solution being added to 150 grams of the aforementioned catalyst base in a steam rotating drier. The impregnated catalyst base was calcined in a muffle oven for a period of one hour at 1300° F. and the finished product thereafter designated as Catalyst III.

Finished catalytic compositions of matter designated as Catalyst IV and Catalyst V, respectively, were prepared in a similar manner by impregnating 67 grams and 87 grams of the catalyst base prepared according to Examples IV and V above with a palladium chloride solution containing 0.0024 grams of palladium per cc., said impregnation being effected in a steam rotating drier. Upon completion of the impregnation and drying, the dried catalysts were calcined for a period of one hour at 1300° F. in the presence of air.

EXAMPLE VII

The finished hydrocracking catalysts which each contained 0.4% palladium by weight of the support were compared with a catalyst containing 0.4% palladium composited on a silica-alumina support of regular density. The silica-alumina support of the reference catalyst was not prepared in a manner similar to that set forth in Examples I to V above, that is, by allowing the silica hydrogel to age for a period of at least one hour at a pH within the range of from about 3 to about 8.

In the evaluation test 100 cc. of the catalyst was placed in a reactor. A white oil having a boiling point range of from 700° to 900° F. was processed under the following conditions: temperature, 600° F.; pressure, 1500 p.s.i.g.; liquid hourly space velocity (amount of charge per amount of catalyst per hour), 1, 2 and 4; 3000 c.f./b. recycle hydrogen gas. The percent at 650° F. by Engler distillation of each test period was plotted against LHSV. The relative activity (RA) was determined by the ratio of the LHSV required to produce a product with a given percent over 650° F. The reference catalyst discussed in the above paragraph was given a relative activity of hydrocracking (RA-HYCK) of 100 for purposes of comparison. The results of the other catalysts, I to V, are set forth in Table I below.

*Table I*

| Catalyst | Percent SiO₂ | RA-HYCK |
|---|---|---|
| I | 37 | 25 |
| II | 54 | 31 |
| III | 64 | 53 |
| IV | 75 | 147 |
| V | 88 | 108 |
| Reference Catalyst | 75 | 100 |

EXAMPLE VIII

To further illustrate the necessity of following a method of preparation of the catalyst base according to the aforementioned steps of (1) allowing the silica hydrogel to age for a period of at least one hour at a critical pH within the range of from about 3 to about 8, (2) adding the alumina in the form of a salt to the aged silica sol and raising the pH, (3) slurrying the resultant gel, (4) filtering and reslurrying, and (5) spray-drying the gel followed by calcination, other catalyst bases were prepared in a dissimilar manner. For example, when a silica-alumina base was prepared by oven drying instead of by spray-drying, the finished catalytic composite, after impregnation with palladium, give hydrocracking results considerably lower than the reference catalyst gave. Likewise, catalyst bases which were prepared by reverse precipitation, that is, by adding a silica-alumina sol to ammonium hydroxide, also gave inferior results when utilized in a hydrocracking operation.

It is therefore readily apparent that cracking catalyst bases which contain 75% silica and 25% alumina (approximately 5 moles of silica per mole of alumina) and which are prepared according to the method set forth in the present specification, that is, by allowing the silica hydrogel to at least partially polymerize by aging for a period of at least one hour at a pH within the range of from about 3 to about 8 before adding alumina thereto, followed by raising of the pH and precipitation, following which the base is spray-dried before calcination thereof, will, after addition of a hydrogenation metal, result in a catalytic composition of matter which exhibits a greater relative activity of hydrocracking than catalytic compositions of matter in which the cracking base contains lesser or greater amounts of silica or in which the base has not been prepared according to the present invention.

EXAMPLE IX

Silica-alumina cracking catalyst bases containing various amounts of silica, such as 37%, 54%, 64% 75% and 88%, prepared according to Examples I to V above may be impregnated with a platinum chloride solution, the platinum being present in such an amount so that the final finished catalyst contains 0.4% by weight of platinum based on the support or a nickel nitrate solution containing sufficient nickel so that the finished catalyst contains 6% by weight of nickel or a molybdenum nitrate solution containing sufficient molybdenum so that the finished catalyst contains 6% by weight of molybdenum. Comparative tests using a white oil stock under similar test conditions to that set forth in Example VII above will demonstrate that those catalysts in which the cracking base or support contains 75% silica and 25% alumina and which have been prepared according to the procedure of the present invention, that is, by aging the silica hydrogel for a period of at least one hour at a pH in the range of from about 3 to about 8 before addition of the alumina and precipitation thereof, followed by spray-drying of the precipitate, will have a relative activity of hydrocracking far in excess and therefore much superior to those catalytic compositions of matter in which the cracking base or support contains a lesser or greater amount of silica or if the base has not been prepared according to the method of the present invention.

I claim as my invention:

1. A hydrocarbon conversion catalyst which comprises at least one metal selected from the group consisting of the metals of Groups VIB and VIII of the Periodic Table composited on a solid acidic support comprising a mixture of silica and alumina in a mole ratio of about 5 moles of silica per mole of alumina, the silica being a silica hydrogel which has been aged for a period of at least one hour at a pH in the range of from about 3 to about 8 prior to compositing with said alumina.

2. A hydrocracking catalyst which comprises from about 0.1 to about 10% by weight of at least one metal selected from the group consisting of the metals of Groups VIB and VIII of the Periodic Table composited on a solid acidic support comprising a mixture of silica and alumina in a mole ratio of about 5 moles of silica per mole of alumina, the silica being a silica hydrogel which has been aged for a period of at least one hour at a pH in the range of from about 3 to about 8 prior to compositing with said alumina.

3. A hydrocracking catalyst which comprises platinum composited on a solid acidic cracking support comprising a mixture of silica and alumina in a mole ratio of about 5 moles of silica per mole of alumina, the silica being a silica hydrogel which has been aged for a period of at least one hour at a pH in the range of from about 3 to about 8 prior to compositing with said alumina.

4. A hydrocracking catalyst which comprises palladium composited on a solid acidic cracking support comprising a mixture of silica and alumina in a mole ratio of about 5 moles of silica per mole of alumina, the silica being a silica hydrogel which has been aged for a period of at least one hour at a pH in the range of from about 3 to about 8 prior to compositing with said alumina.

5. A hydrocracking catalyst which comprises molybdenum composited on a solid acidic cracking support comprising a mixture of silica and alumina in a mole ratio of about 5 moles of silica per mole of alumina, the silica being a silica hydrogel which has been aged for a period of at least one hour at a pH in the range of from about 3 to about 8 prior to compositing with said alumina.

6. A hydrocracking catalyst which comprises nickel composited on a solid acidic cracking support comprising a mixture of silica and alumina in a mole ratio of about 5 moles of silica per mole of alumina, the silica being a silica hydrogel which has been aged for a period of at least one hour at a pH in the range of from about 3 to about 8 prior to compositing with said alumina.

7. A hydrocracking catalyst which comprises molybdenum and nickel composited on a solid acidic cracking support comprising a mixture of silica and alumina in a mole ratio of about 5 moles of silica per mole of alumina, the silica being a silica hydrogel which has been aged for a period of at least one hour at a pH in the range of from about 3 to about 8 prior to compositing with said alumina.

8. A process for the conversion of hydrocarbons which comprises destructively hydrogenating said hydrocarbons in contact with a catalytic composite of at least one metal selected from the group consisting of the metals of Groups VIB and VIII of the Periodic Table supported on a mixture of silica and alumina, said silica being present in a mole ratio of about 5 moles of silica per mole of alumina, the silica being a silica hydrogel which has been aged for a period of at least one hour at a pH in the range of from about 3 to about 8 prior to compositing with said alumina.

9. A process for the conversion of hydrocarbons which comprises destructively hydrogenating said hydrocarbons in contact with a catalytic composite of from about 0.1 to about 10% by weight of at least one metal selected from the group consisting of the metals of Groups VIB and VIII of the Periodic Table supported on a mixture of silica and alumina, said silica being present in a mole ratio of about 5 moles of silica per mole of alumina, the silica being a silica hydrogel which has been aged for a period of at least one hour at a pH in the range of from about 3 to about 8 prior to compositing with said alumina.

10. A process for the conversion of hydrocarbons which comprises destructively hydrogenating said hydrocarbons in contact with a catalytic composite comprising about 0.4% by weight of platinum supported on a mixture of silica and alumina, said silica being present in a mole ratio of about 5 moles of silica per mole of alumina, the silica being a silica hydrogel which has been aged for a period of at least one hour at a pH in the range of from about 3 to about 8 prior to compositing with said alumina.

11. A process for the conversion of hydrocarbons which comprises destructively hydrogenating said hydrocarbons in contact with a catalytic composite comprising about 0.4% by weight of palladium supported on a mixture of silica and alumina, said silica being present in a mole ratio of about 5 moles of silica per mole of alumina, the silica being a silica hydrogel which has been aged for a period of at least one hour at a pH in the range of from about 3 to about 8 prior to compositing with said alumina.

12. A process for the conversion of hydrocarbons which comprises destructively hydrogenating said hydrocarbons in contact with a catalytic composite comprising about 6% by weight of molybdenum supported on a mixture of silica and alumina, said silica being present in a mole ratio of about 5 moles of silica per mole of alumina, the silica being a silica hydrogel which has been aged for a period of at least one hour at a pH in the range of from about 3 to about 8 prior to compositing with said alumina.

13. A process for the conversion of hydrocarbons which comprises destructively hydrogenating said hydrocarbons in contact with a catalytic composite comprising about 6% by weight of nickel supported on a mixture of silica and alumina, said silica being present in a mole ratio of about 5 moles of silica per mole of alumina, the silica being a silica hydrogel which has been aged for a period of at least one hour at a pH in the range of from about 3 to about 8 prior to compositing with said alumina.

References Cited by the Examiner
UNITED STATES PATENTS

| | | | |
|---|---|---|---|
| 2,908,635 | 10/59 | Ogorzally | 208—120 |
| 2,944,005 | 7/60 | Scott | 208—109 |
| 2,945,806 | 7/60 | Ciapetta | 208—110 |

ALPHONSO D. SULLIVAN, *Primary Examiner.*